(12) United States Patent
Croix

(10) Patent No.: US 6,931,634 B2
(45) Date of Patent: Aug. 16, 2005

(54) ENCRYPTED COMPILER

(75) Inventor: John F. Croix, Austin, TX (US)

(73) Assignee: Silicon Metrics Corporation, Austin, TX (US)

(*) Notice: Subject to any disclaimer, the term of this patent is extended or adjusted under 35 U.S.C. 154(b) by 726 days.

(21) Appl. No.: 09/746,860

(22) Filed: Dec. 21, 2000

(65) Prior Publication Data
US 2004/0205735 A1 Oct. 14, 2004

(51) Int. Cl.⁷ .............................................. G06F 9/45
(52) U.S. Cl. ...................................................... 717/146
(58) Field of Search ................................ 717/140, 166, 717/168–178; 713/165, 200, 176–199; 375/240; 709/1, 237, 247; 705/26, 57, 80

(56) References Cited

U.S. PATENT DOCUMENTS 5,699,428 A * 12/1997 McDonnal et al. ......... 713/165
6,073,236 A * 6/2000 Kusakabe et al. .......... 713/169
6,334,189 B1 * 12/2001 Granger et al. ............. 713/200
6,684,389 B1 * 1/2004 Tanaka et al. .............. 717/140
2002/0080871 A1 * 6/2002 Fallon et al. ................ 375/240

FOREIGN PATENT DOCUMENTS

GB       2343022       *  4/2000       .............. G06F/1/00

OTHER PUBLICATIONS

Chiang et al., "Method for Protecting Bytecode", WO 99/41651 (Aug. 19, 1999).*
U.S. Appl. No. 60/237,571, filed Mar. 10, 2000, Fallon et al.*

* cited by examiner

Primary Examiner—Todd Ingberg
Assistant Examiner—Tuan Anh Vu
(74) Attorney, Agent, or Firm—Fulbright & Jaworski LLP

(57) ABSTRACT

Systems and methods are described for an encrypted compiler. A method includes generating a first sub-file of source code; then encrypting said first sub-file of source code; then writing said first sub-file of source code to a buffer; then reading a second sub-file of source code from said buffer; then decrypting said second sub-file of source code; and then compiling said second sub-file of source code.

48 Claims, 2 Drawing Sheets

ENCRYPTED COMPILER

BACKGROUND OF THE INVENTION

1. Field of the Invention

The invention relates generally to the field of computer science. More particularly, the invention relates to software.

2. Discussion of the Related Art

Prior art source code compilers are known to those skilled in the art. A source code compiler transforms source code into an executable, shared object library or object file. The resulting executable, shared object library or object file is then utilized by a computer system.

The executable, shared object library or object file may be specific to a given computer system and can be very difficult to reverse engineer. Consequently, the proprietary content of these files is relatively secure.

On the other hand, the proprietary content of source code is relatively non-secure. There are times in which source code for some or all of an application will be exposed to one or more individuals in an insecure environment. The person or company that wrote, generated, or distributed the source code may find this unacceptable but may have no recourse except to do so and attempt to limit exposure through the use of copyright, legal agreements and reverse engineering impediments.

The source code itself is vulnerable to copying. Although source code may be copyrighted, detection of unauthorized copying may be impossible. Further, even where detection is possible, the cost of copyright enforcement may be prohibitive. Therefore, what is needed is a solution that protects the proprietary content of source code more effectively than copyright.

Legal agreements (e.g., licenses, nondisclosure agreements, etc.) can also have violation detection and enforcement problems. Therefore, what is also needed is a solution that protects the proprietary content of source code more effectively than by legal agreement.

Source code is also vulnerable to reverse engineering. The proprietary content of source code can be harvested without apparent copyright violation if the algorithmic content can be gleamed through analysis and then restyled as another expression. Reverse engineering can also present practical problems to respect to legal agreements. What is also needed, therefore, is a solution that protects the proprietary content of source code from reverse engineering.

One unsatisfactory approach, in an attempt to protect the proprietary content of source code involves obfuscation. For instance, an algorithm may be discretely located within a much larger block of code. Further, an algorithm may be separated into subsections that are individually located throughout different parts of a program. Furthermore, spurious code lines may be added to the algorithm and/or the program in a deliberate attempt to mislead.

Another approach to obfuscation involves removing all meaningful variable names and replacing them with non-meaningful ones (for example, replace "BinaryTreePointer" with "I1". The approach can also be extended to removing all comments, indentation, etc. that makes code easy to read. Finally, another approach to obfuscation involves replacing sections of code with macros that make the reverse engineering of such code more difficult.

However, given enough time and/or resources, systematic analysis may yield the algorithmic content despite attempts at obfuscation. Therefore, what is also needed is a solution that impedes reverse engineering more effectively than obfuscation.

Another disadvantage of the obfuscation approach is that debugging and/or modification of the source code may become problematic. The tactics used for obfuscation can make it more difficult for a subsequent authorized programmer to understand the source code, especially when documentation is nonexistent. Therefore, what is also needed is a solution that impedes reverse engineering without hindering debugging and/or modification of the source code.

Another disadvantage of the obfuscation approach has been relatively high cost. A large amount of extraneous code may be required to provide cover for the proprietary content. These additional lines of code can increase the time required to compile substantially. Therefore, what is also needed is a solution that prevents reverse engineering in a more cost-effective manner.

Heretofore, the requirements of providing more effective protection for source code than copyright, legal agreement or obfuscation, without hindering debugging and/or modification or incurring excessive costs, referred to above have not been fully met. What is needed is a solution that addresses all of these requirements.

SUMMARY OF THE INVENTION

Thus, there is a need for the following embodiments. One embodiment of the invention is based on a method, comprising: generating a first sub-file of source code; then encrypting said first sub-file of source code; then writing said first sub-file of source code to a buffer; then reading a second sub-file of source code from said buffer; then decrypting said second sub-file of source code; and then compiling said second sub-file of source code. Another embodiment of the invention is based on an apparatus, comprising: an on-the-fly source code encrypter; a buffer coupled to said source code encrypter; a source code decrypter coupled to said buffer; and a compiler coupled to said source code decrypter. Another embodiment of the invention is based on an electronic media, comprising a computer program adapted to: generate a first sub-file of source code; then encrypt said first sub-file of source code; then write said first sub-file of source code to a buffer; then read a second sub-file of source code from said buffer; then decrypt said second sub-file of source code; and then compile said second sub-file of source code. Another embodiment of the invention is based on a computer program comprising computer program means adapted to perform the steps of generating a first sub-file of source code; then encrypting said first sub-file of source code; then writing said first sub-file of source code to a buffer; then reading a second sub-file of source code from said buffer; then decrypting said second sub-file of source code; and then compiling said second sub-file of source code when said program is run on a computer.

These, and other, embodiments of the invention will be better appreciated and understood when considered in conjunction with the following description and the accompanying drawings. It should be understood, however, that the following description, while indicating various embodiments of the invention and numerous specific details thereof, is given by way of illustration and not of limitation. Many substitutions, modifications, additions and/or rearrangements may be made within the scope of the invention without departing from the spirit thereof, and the invention includes all such substitutions, modifications, additions and/or rearrangements.

BRIEF DESCRIPTION OF THE DRAWINGS

The drawings accompanying and forming part of this specification are included to depict certain aspects of the invention. A clearer conception of the invention, and of the components and operation of systems provided with the invention, will become more readily apparent by referring to the exemplary, and therefore nonlimiting, embodiments illustrated in the drawings, wherein like reference numerals (if they occur in more than one view) designate the same elements. The invention may be better understood by reference to one or more of these drawings in combination with the description presented herein. It should be noted that the features illustrated in the drawings are not necessarily drawn to scale.

DESCRIPTION OF PREFERRED EMBODIMENTS

Figure 1:
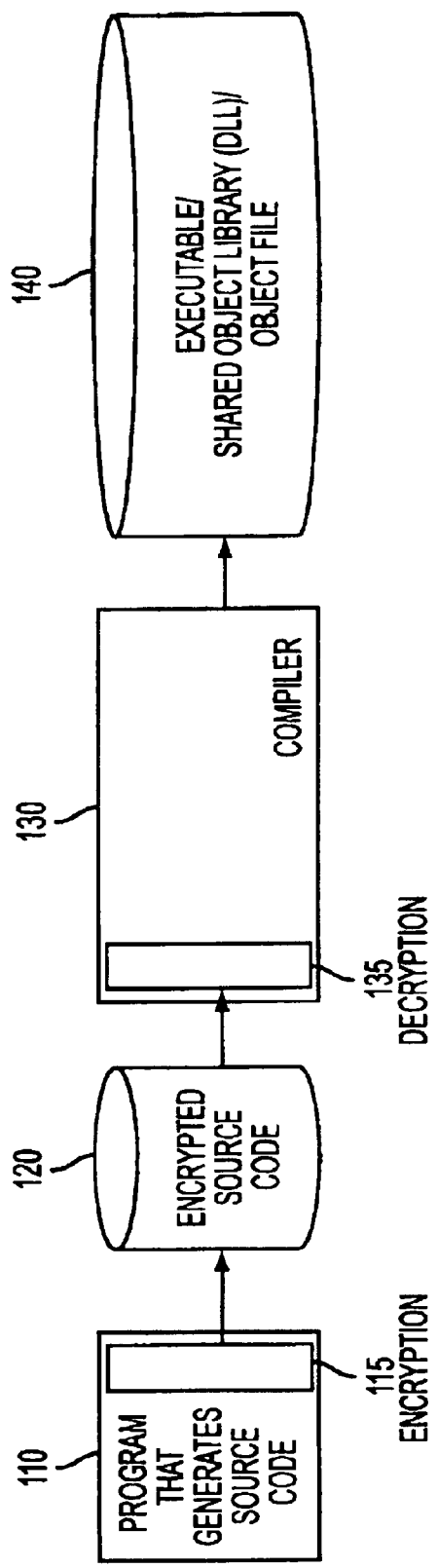
FIG. 1 illustrates a flow diagram of a process that can be implemented by a computer program, representing an embodiment of the invention.

The invention and the various features and advantageous details thereof are explained more fully with reference to the nonlimiting embodiments that are illustrated in the accompanying drawings and detailed in the following description. Descriptions of well known components and processing techniques are omitted so as not to unnecessarily obscure the invention in detail. It should be understood, however, that the detailed description and the specific examples, while indicating preferred embodiments of the invention, are given by way of illustration only and not by way of limitation. Various additions, changes and modifications within the spirit and scope of the underlying inventive concept will become apparent to those skilled in the art from this detailed description.

The context of the invention can include internet distribution of source code. The context of the invention can also include Java source code distribution for web browsers. The context of the invention can also include source code generation in an adversarial environment.

The invention can include generation/exhibition and/or compilation of source code in an insecure environment through encryption. By using encryption, source code can be safely generated or exhibited, even in insecure environments. Source code should be encrypted before it is put in an environment where it can be examined. The term encryption, as used herein, is defined as enciphering and/or encoding. Before or during compilation, the encrypted source code can be decrypted. The term decryption, as used herein, is defined as deciphering and/or decoding.

A preferred implementation of the invention relates to a source code generation and/or compiling approach that encrypts source code before it is put in an environment in which it can be copied/examined. In this implementation, a compiler reads encrypted source code by deciphering the encrypted source code. The invention thus relates to a compiler of the type that can be termed encrypted.

The invention can include two components: source code generation and source code compilation. Source code generation will be described first followed by a description of source code compilation.

In source code generation, the source code needs to be encrypted using a scheme understood by the compiler. Encryption can occur on-the-fly as source code is created (e.g., line-by-line if an automated program is generating the source code) or all-at-once (only recommended for environments in which the source code generation is guaranteed to be secure). The encrypted source code can then be written to a file. This encrypted file can be termed a buffer. The encrypted source code is then fed to a version of the compiler that can consume encrypted source code.

In source code compilation, the compiler reads the encrypted source code and decrypts it for compilation. Decryption can occur on-the-fly or on the entire image, as chosen by the compiler writer. Normal compilation then proceeds.

In the event that an intermediate form of the source code needs to be generated (e.g., as input to a separate program that is part of a compiler suite), the intermediate form can be re-encrypted for consumption by the next stage. At no point in the compilation process should an intermediate form be made available which compromises the security of the original source code.

Usually compilers work on one or more files at a time, not on a line by line basis. On a file basis encryption can be a public key encryption. Of course, there are many different possibilities for public encryption, not just public key encryption.

Under some circumstance, it can be advantageous for the compiler to be able to understand both encrypted source and "normal" source code within the same compilation (e.g., C include files). The compiler can be enabled to detect by analysis (e.g., string and/or character) when input is encrypted source code or when input is normal source code.

It is important that the output of the compiler that consumes encrypted source code should be identical in functionality and content to the output of the same compiler when consuming non-encrypted source code. If the output is not identical, functionality may be lost and user acceptance may be diminished.

The invention can include on-the-fly encryption of source code combined with on-the-fly decryption before compiling. The phrase on-the-fly, as used herein with respect to encryption, is defined as not having to create all the source code for an entire file first and then encrypting it. A portion of the file is created and then encrypted and then written to a buffer. Similarly, the phrase on-the-fly, as used herein with respect to decryption, is defined as not having to decrypt all the source code for a file first and then compiling it. As above, the granularity of on-the-fly decryption is limited only by the minimum bit string length required by a given decryption scheme. The source code can be decrypted (and then compiled) a few lines at a time, one line at a time, or less than one line at a time (e.g., one file at a time).

While not being limited to any particular performance indicator or diagnostic identifier, preferred embodiments of the invention can be identified one at a time by testing for the presence of quick compiling. The test for the presence of quick compiling can be carried out without undue experimentation by the use of a simple and conventional bench mark experiment.

The granularity of on-the-fly encryption is limited only by the minimum bit string length required for a given encryption scheme. The source code can be created (generated) and then encrypted a few lines at a time, one line at a time, or less than one line at a time (e.g., a field at a time).

As the process continues, the granularity of the encryption and/or decryption can be varied. Thus, the encryption can take place based on at least two of field, line and multi-line. Similarly, the decryption can take place based on at least two of field, line and multi-line. This variation in granularity can take place at both the source code level and the intermediate source code level.

When the sub-file granularity is excessively low, reverse engineering of the encrypted compiler approach may be too easy. Reverse engineering of the encrypted compilation process should be more difficult than reverse engineering of the executable/shared object library. On the other hand, when the sub-file granularity is excessively high, the time required to compile the decrypted code may be too high.

Two scenarios of the invention will now be described. In the first scenario, source code is created in a secure environment, encrypted and then distributed to an insecure environment. In the second scenario, source code is created in an insecure environment. Of course, the second method could still be used within a secure environment and the encrypted source code distributed.

The source code distribution scenario begins with the creation of source code in a secure environment. The source code is then encrypted using an encryption scheme that is supported by the compiler which will compile the encrypted source code. The encrypted source code is then distributed to one or more users. Since the source code is encrypted, distribution can be via non-secure channels. The user(s) then compile(s) the encrypted source code, optionally using a version of the compiler that can decrypt the source code on-the-fly. As a result, object code is produced.

The source code generation scenario begins with on-the-fly creation of source code combined with on-the-fly encryption on a memory image of the source code or on a source code data stream. The encrypted source code is then sent on-the-fly to an encrypted compiler associated with a user. The use compiles encrypted source code using a version of the compiler that can decrypt the source code on-the-fly. Object code is produce as a result.

The term substantially, as used herein, is defined as at least approaching a given state (e.g., preferably within 10% of, more preferably within 1% of, and most preferably within 0.1% of). The term coupled, as used herein, is defined as connected, although not necessarily directly, and not necessarily mechanically. The term deploying, as used herein, is defined as designing, building, shipping, installing and/or operating. The term means, as used herein, is defined as hardware, firmware and/or software for achieving a result. The term program or phrase computer program, as used herein, is defined as a sequence of instructions designed for execution on a computer system. A program, or computer program, may include a subroutine, a function, a procedure, an object method, an object implementation, an executable application, an applet, a servlet, a source code, an object code, a shared library/dynamic load library and/or other sequence of instructions designed for execution on a computer system. The terms including or having, as used herein, are to be defined as comprising. The terms a or an, as used herein, are defined as one or more than one. The term another, as used herein, is defined as at least a second or more.

EXAMPLES

Specific embodiments of the invention will now be further described by the following, nonlimiting examples which will serve to illustrate in some detail various features. The following examples are included to facilitate an understanding of ways in which the invention may be practiced. It should be appreciated that the examples which follow represent embodiments discovered by the inventor(s) to function well in the practice of the invention, and thus can be considered to constitute preferred modes for the practice of the invention. However, it should be appreciated that many changes can be made in the exemplary embodiments which are disclosed while still obtaining like or similar result without departing from the spirit and scope of the invention. Accordingly, the examples should not be construed as limiting the scope of the invention.

Example 1

Referring to FIG. 1, a program that generates source code 110 can include an encryption module 115. Encrypted source code is written to an encrypted source code buffer 120. In this example, encrypted source code is written in sub-file batches containing one line of code. When the encrypted source code is ready for compiling by a compiler 130 (e.g., when a complete encrypted line has been written to the buffer 120), a decryption module 135 within the compiler 130 decrypts the encrypted source code line. Of course, decryption can be delayed until after the entire encrypted source code file is written, or until after multiple encrypted lines of source code have been written. In this example, the decryption by module 135 is one line at a time and commences as soon as possible. Matching the size of the decryption field to the size of the encryption field can reduce latency within the buffer 120, thereby reducing total process time.

There are "pipelined" versions of compilers that function in this way. They usually send intermediate data between multiple programs that make up the compiler suite. This example would also be useful in conjunction with Java.

Both the encryption module 115 and the decryption module 135 can utilize a rolling key for enhanced security. The rolling key can be changed every time a complete file is transferred from the program 110 to the compiler 130. The rolling key can be updated based on a lookup table that is recyclable or based on an algorithm.

The compiler 130 generates an executable/shared object library (DLL)/object file 140. The executable/shared object library (DLL)/object file 140 can then be utilized by another program such as a circuit model.

Example 2

Figure 2:
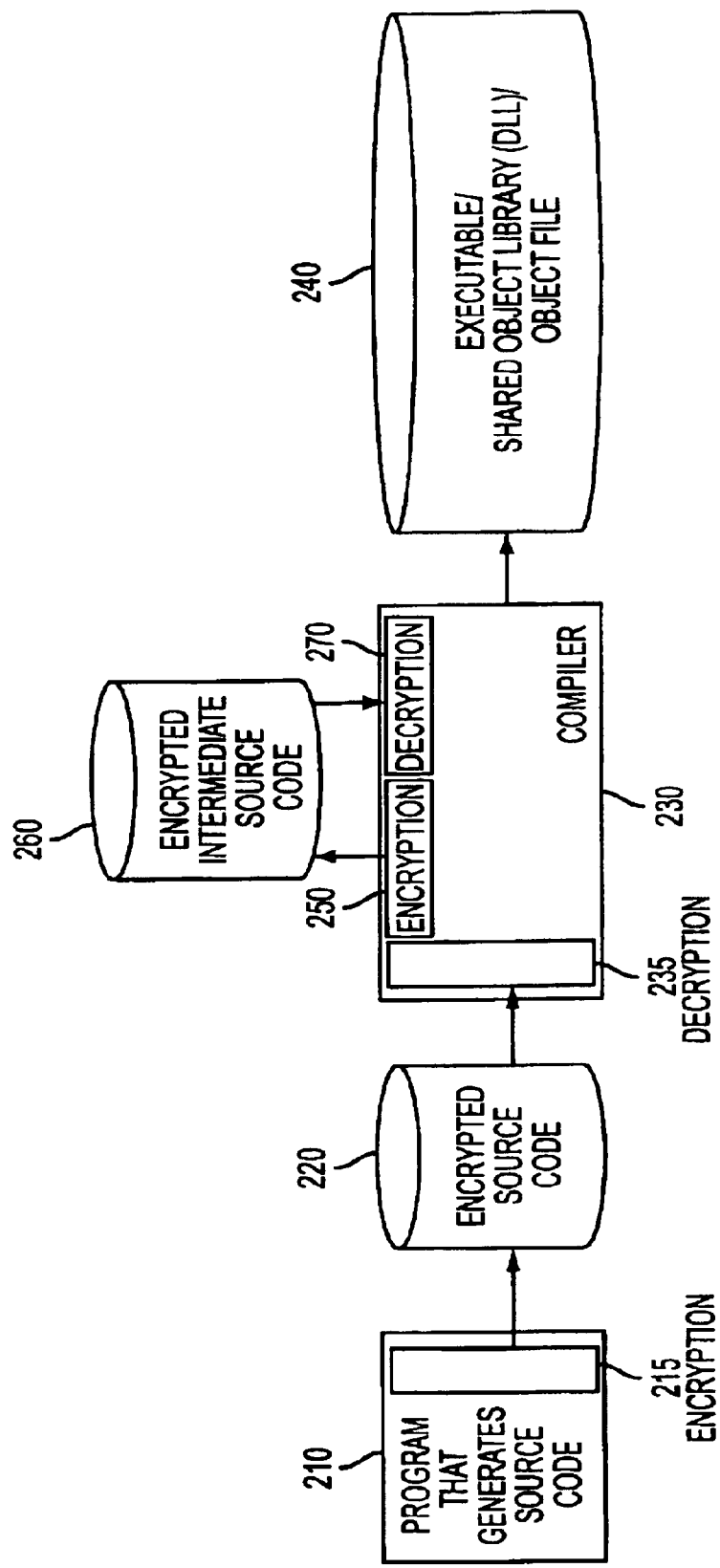
FIG. 2 illustrates a flow diagram of another process that can be implemented by a computer program, representing an embodiment of the invention.

Referring to FIG. 2, another program that generates source code 210 can include an encryption module 215. Encrypted source code is written to an encrypted source code buffer 220. In this example, encrypted source code is written in sub-file batches that are pseudo randomly varied between a field, a line and multiple number of lines of code. By varying the size of the sub-file, reverse engineering of the encrypted compilation process is made more difficult. When the encrypted source code is ready for compiling by a compiler 230, (e.g., when an entire file has been encrypted and written to the buffer 220) a decryption module 235 within the compiler 230 decrypts the encrypted source code. Of course, decryption can commence sooner, such as after one, or more, lines of source code have been written to the buffer 220, or even as soon as an encrypted field has been written. In this example, the decryption by module 235 is after an entire file has been written to the buffer 220. It is important to appreciate that the size of the decryption batch does not need to match the size of the encryption batch.

In this example, the compiler 230 generates intermediate source code. To maintain security, the compiler 230 includes an intermediate source code encryption module 250. Encrypted intermediate source code is written to an encrypted intermediate source code buffer 260. In this example, the encrypted intermediate source code is also written in sub-file batches that are pseudo randomly varied between a field, a line and multiple number of lines of code to make reverse engineering of the encrypted compilation process is made more difficult. When the encrypted intermediate source code is ready for further compiling by the compiler 230, a decryption module 270 within the compiler 230 decrypts the encrypted intermediate source code. In this example, the decryption by module 270 is after an entire file has been written to the buffer 260. Again, it is important to appreciate that the size of the decryption batch does not need to match the size of the encryption batch.

Similar to the previous example, the compiler 230 generates an executable/shared object library (DLL)/object file 240. The executable/shared object library (DLL)/object file 240 can then be utilized by another program such as a circuit model.

Practical Applications of the Invention

A practical application of the invention that has value within the technological arts is distribution of source code over the internet. Further, the invention is useful in conjunction with distribution of Java source code for web browsers, or in conjunction with source code generation in adversarial environments, or the like. There are virtually innumerable uses for the invention, all of which need not be detailed here.

Advantages of the Invention

A sub-system, representing an embodiment of the invention, can be cost effective and advantageous for at least the following reasons. The invention provides more effective protection for source code than copyright, legal agreement or obfuscation without hindering debugging and/or modification or incurring excessive costs.

All the disclosed embodiments of the invention disclosed herein can be made and used without undue experimentation in light of the disclosure. Although the best mode of carrying out the invention contemplated by the inventor(s) is disclosed, practice of the invention is not limited thereto. Accordingly, it will be appreciated by those skilled in the art that the invention may be practiced otherwise than as specifically described herein.

For example, variation may be made in the steps or in the sequence of steps composing methods described herein. Further, the individual components need not be combined in the disclosed configurations, but could be combined in virtually any configuration.

Further, although the sub-system described herein can be a separate module, it will be manifest that the sub-system may be integrated into the system with which it is associated. Furthermore, all the disclosed elements and features of each disclosed embodiment can be combined with, or substituted for, the disclosed elements and features of every other disclosed embodiment except where such elements or features are mutually exclusive.

It will be manifest that various substitutions, modifications, additions and/or rearrangements of the features of the invention may be made without deviating from the concept, spirit and/or scope of the underlying inventive concept. The concept, spirit and/or scope of the invention as defined by the appended claims and their equivalents cover all such substitutions, modifications, additions and/or rearrangements.

The appended claims are not to be interpreted as including means-plus-function limitations, unless such a limitation is explicitly recited in a given claim using the phrase(s) "means for" and/or "step for." Subgeneric embodiments of the invention are delineated by the appended independent claims and their equivalents. Specific embodiments of the invention are differentiated by the appended dependent claims and their equivalents.

What is claimed is:

1. A method, comprising:
   generating a first sub-file of source code; then
   encrypting said first sub-file of source code; then
   writing said first sub-file of source code to a buffer; then
   reading a second sub-file of source code from said buffer; then
   decrypting said second sub-file of source code; and then
   compiling said second sub-file of source code, said compiling including:
     generating a first sub-file of intermediate source code; then
     encrypting said first sub-file of intermediate source code; then
     writing said first sub-file of intermediate source code to another buffer; then
     reading a second sub-file of intermediate source code from said another buffer; then
     decrypting said second sub-file of intermediate source code; and then
     compiling said second sub-file of intermediate source code.

2. The method of claim 1, wherein said first sub-file of source code comprises a line of source code.

3. The method of claim 1, wherein said first sub-file of source code consists of a line of source code.

4. The method of claim 1, wherein said second sub-file of source code comprises a line of source code.

5. The method of claim 1, wherein said second sub-file of source code consists of a line of source code.

6. The method of claim 1, wherein said first sub-file of source code is equivalent in size to said second sub-file of source code.

7. The method of claim 1, wherein said first sub-file of source code is substantially larger in size than said second sub-file of source code.

8. The method of claim 1, wherein said first sub-file of source code is substantially smaller in size than said second sub-file of source code.

9. The method of claim 1, further comprising:
   generating a third sub-file of source code; then
   encrypting said third sub-file of source code; then
   writing said third sub-file of source code to said buffer; then
   reading a fourth sub-file of source code from said buffer; then
   decrypting said fourth sub-file of source code; and then
   compiling said fourth sub-file of source code.

10. The method of claim 9, wherein said third sub-file of source code comprises a line of source code.

11. The method of claim 9, wherein said third sub-file of source code consists of a line of source code.

12. The method of claim 9, wherein said fourth sub-file of source code comprises a line of source code.

13. The method of claim 9, wherein said fourth sub-file of source code consists of a line of source code.

14. The method of claim 9, wherein said third sub-file of source code is equivalent in size to said fourth sub-file of source code.

15. The method of claim 9, wherein said third sub-file of source code is substantially larger in size than said fourth sub-file of source code.

16. The method of claim 9, wherein said third sub-file of source code is substantially smaller in size than said fourth sub-file of source code.

17. The method of claim 9, wherein said first sub-file of source code is equivalent in size to said third sub-file of source code.

18. The method of claim 9, wherein said first sub-file of source code is substantially larger in size than said third sub-file of source code.

19. The method of claim 9, wherein said first sub-file of source code is substantially smaller in size than said third sub-file of source code.

20. The method of claim 9, wherein said second sub-file of source code is equivalent in size to said fourth sub-file of source code.

21. The method of claim 9, wherein said second sub-file of source code is substantially larger in size than said fourth sub-file of source code.

22. The method of claim 9, wherein said second sub-file of source code is substantially smaller in size than said fourth sub-file of source code.

23. The method of claim 1, wherein said first sub-file of intermediate source code comprises a line of source code.

24. The method of claim 1, wherein said first sub-file of intermediate source code consists of a line of intermediate source code.

25. The method of claim 1, wherein said second sub-file of intermediate source code comprises a line of intermediate source code.

26. The method of claim 25, wherein said second sub-file of intermediate source code consists of said line of source code.

27. The method of claim 1, wherein said first sub-file of intermediate source code is equivalent in size to said second sub-file of intermediate source code.

28. The method of claim 1, wherein said first sub-file of intermediate source code is substantially larger in size than said second sub-file of intermediate source code.

29. The method of claim 1, wherein said first sub-file of intermediate source code is substantially smaller in size than said second sub-file of intermediate source code.

30. The method of claim 1, further comprising:
generating a third sub-file of intermediate source code; then
encrypting said third sub-file of intermediate source code; then
writing said third sub-file of intermediate source code to said another buffer; then
reading a fourth sub-file of intermediate source code from said another buffer; then
decrypting said fourth sub-file of intermediate source code; and then
compiling said fourth sub-file of intermediate source code.

31. The method of claim 30, wherein said third sub-file of intermediate source code comprises a line of source code.

32. The method of claim 30, wherein said third sub-file of intermediate source code consists of a line of intermediate source code.

33. The method of claim 30, wherein said fourth sub-file of intermediate source code comprises a line of intermediate source code.

34. The method of claim 30, wherein said fourth sub-file of intermediate source code consists of a line of source code.

35. The method of claim 30, wherein said third sub-file of intermediate source code is equivalent in size to said fourth sub-file of intermediate source code.

36. The method of claim 30, wherein said third sub-file of intermediate source code is substantially larger in size than said fourth sub-file of intermediate source code.

37. The method of claim 30, wherein said third sub-file of intermediate source code is substantially smaller in size than said fourth sub-file of intermediate source code.

38. The method of claim 30, wherein said first sub-file of intermediate source code is equivalent in size to said third sub-file of intermediate source code.

39. The method of claim 30, wherein said first sub-file of intermediate source code is substantially larger in size than said third sub-file of intermediate source code.

40. The method of claim 30, wherein said first sub-file of intermediate source code is substantially smaller in size than said third sub-file of intermediate source code.

41. The method of claim 30, wherein said second sub-file of intermediate source code is equivalent in size to said fourth sub-file of intermediate source code.

42. The method of claim 30, wherein said second sub-file of intermediate source code is substantially larger in size than said fourth sub-file of intermediate source code.

43. The method of claim 30, wherein said second sub-file of intermediate source code is substantially smaller in size than said fourth sub-file of intermediate source code.

44. A computer program, comprising computer or machine readable program elements translatable for implementing the method of claim 1.

45. An apparatus for performing the method of claim 1.

46. A computer program compiled by the method of claim 1.

47. A circuit designed using the computer program of claim 46.

48. An electronic media, comprising a program for performing the method of claim 1.

* * * * *